US012759311B2

(12) United States Patent
Hochwind

(10) Patent No.: US 12,759,311 B2
(45) Date of Patent: Oct. 13, 2026

(54) TEST PATTERN FOR DETECTING AN IMPAIRED NOZZLE WITH TRANSVERSE OFFSET

(71) Applicant: Canon Production Printing Holding B.V., Venlo (NL)

(72) Inventor: Bernhard Hochwind, Munich (DE)

(73) Assignee: Canon Production Printing Holding B.V., Venlo (NL)

( * ) Notice: Subject to any disclaimer, the term of this patent is extended or adjusted under 35 U.S.C. 154(b) by 209 days.

(21) Appl. No.: 18/736,050

(22) Filed: Jun. 6, 2024

(65) Prior Publication Data

US 2024/0408892 A1 Dec. 12, 2024

(30) Foreign Application Priority Data

Jun. 7, 2023 (DE) ..................... 10 2023 115 023.5

(51) Int. Cl.
*B41J 2/21* (2006.01)

(52) U.S. Cl.
CPC ........... *B41J 2/2135* (2013.01); *B41J 2/2142* (2013.01)

(58) Field of Classification Search
CPC .............................. B41J 2/2135; B41J 2/2142
See application file for complete search history.

(56) References Cited

U.S. PATENT DOCUMENTS

2014/0085369 A1* 3/2014 Allworth ............. B41J 2/16579 347/14
2019/0105895 A1 4/2019 Muehl et al.
2019/0160809 A1 5/2019 Neeb et al.
2021/0107278 A1* 4/2021 Schneider ............ B41J 2/04558

FOREIGN PATENT DOCUMENTS

DE 102016224303 A1 6/2018
DE 102017217993 B3 7/2018
DE 102018217124 A1 5/2019

* cited by examiner

*Primary Examiner* — Jason S Uhlenhake
(74) *Attorney, Agent, or Firm* — The Webb Law Firm

(57) ABSTRACT

A test pattern is described for detecting an impaired nozzle of an inkjet printing device. The test pattern has a matrix with matrix points. The printed matrix points in the individual columns respectively exhibit a defined spacing relative to one another in the row direction. An impaired nozzle with transverse offset can thus be particularly reliably and robustly detected.

14 Claims, 3 Drawing Sheets

TEST PATTERN FOR DETECTING AN IMPAIRED NOZZLE WITH TRANSVERSE OFFSET

CROSS-REFERENCE TO RELATED APPLICATION

This application claims priority to German Patent Application No. 10 2023 115 023.5 filed Jun. 7, 2023, the disclosure of which is hereby incorporated by reference in its entirety.

BACKGROUND OF THE INVENTION

Field of the Invention

The invention relates to the detection of at least one impaired nozzle of a print head of an inkjet printing device.

An inkjet printing device for printing to a recording medium can comprise at least one print bar having one or more print heads, wherein each print head typically has a plurality of nozzles. The nozzles are respectively configured to eject ink droplets in order to print dots of a print image onto the recording medium. During the printing, an impairment of one or more nozzles of a print head may occur, for example due to contaminants.

SUMMARY OF THE INVENTION

The present disclosure deals with the technical object of enabling a particularly efficient, reliable, and robust detection of an impaired nozzle of a print head. The object is respectively achieved via the features as described herein.

According to one aspect of the invention, a test pattern for detecting an impaired nozzle of a print head of an inkjet printing device is described. The print head comprises K nozzles, for example with K>10, that are designed to print corresponding K dots in corresponding K columns of a line of a print image onto a recording medium.

The test pattern comprises, in particular is, an N×M matrix with Z matrix points, wherein the matrix has N rows, M columns, and Z=N×M matrix points. The test pattern therefore has, in each of the M columns, a respective sequence of N matrix points of which one or more are printed matrix points and one or more are non-printed matrix points, in particular such that the sum of the one or more printed matrix points and the one or more non-printed matrix points yields precisely N, wherein N is preferably N>1.

The pattern can be as wide as the print head 103; however, it is normally narrower and repeats periodically until the entire print head or the region thereof to be examined is covered. It is additionally to be noted that not only the evaluation on the basis of a plurality (>=1) of patterns printed side by side can take place. >=1 patterns can also be chosen in the training of the network. The network is accordingly constructed as a CNN (Convolutional Neural Network) with subsequent pooling and flattening, such that it is not the pattern width that enters into the training parameters but rather the pattern height. The training, and the operation of the network, with arbitrary counts of patterns repeating along the width can thereby take place.

A printed matrix point in a defined column and in a defined row indicates that the nozzle corresponding to the defined column prints at least or precisely one dot in the printing of the defined row of the test pattern. A non-printed matrix point in the defined column and in the defined row indicates that the nozzle corresponding to the defined column prints no dot in the printing of the defined row of the test pattern.

The sequences of N matrix points in the M columns differ from one another such that a lateral offset of up to ±V columns of the test pattern can be detected and compensated for, with V≥1.

According to a further aspect of the invention, a method and a corresponding control unit for an inkjet printing device are described. The method is designed for detection of an impaired nozzle of a print head of the inkjet printing device. The print head comprises K nozzles, for example with K>10, that are designed to print corresponding K dots in corresponding K columns of a line of a print image onto a recording medium.

The method comprises effecting that a test pattern, which is designed as described in this disclosure, is printed by the print head onto a recording medium, and thus a test print image corresponding to the test pattern is printed onto the recording medium.

The method also comprises the acquisition of sensor data with regard to the test pattern printed onto the recording medium, i.e. with regard to the test print image. Furthermore, the method comprises the detection of at least one impaired nozzle of the print head on the basis of the sensor data. The at least one impaired nozzle can be detected especially robustly and reliably using a neural network trained in advance.

BRIEF DESCRIPTION OF THE DRAWINGS

Exemplary embodiments of the invention are described in detail in the following using the schematic drawings. Thereby shown are.

DESCRIPTION OF THE INVENTION

Figure 1A:
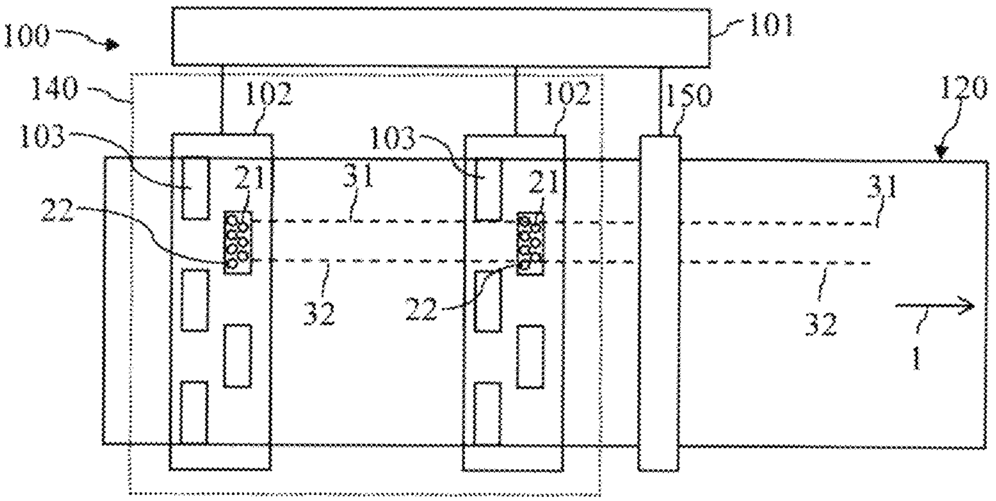
FIG. 1*a* a block diagram of an example of an inkjet printing device.

The printing device 100 depicted in FIG. 1*a* is designed for printing onto a recording medium 120 in the form of a sheet or page or plate or belt. The recording medium 120 can be produced from paper, paperboard, cardboard, metal, plastic, textiles, a combination thereof, and/or other materials that are suitable and can be printed to. The recording medium 120 is transported along the transport and/or printing direction 1 (represented by an arrow) through the print group 140 of the printing device 100.

In the depicted example, the print group 140 of the printing device 100 comprises two print bars 102, wherein each print bar 102 can be used for printing with ink of a defined color (for example black, cyan, magenta, and/or yellow, and MICR ink if applicable). Furthermore, the printing device 100 typically comprises at least one fixing or drying unit 150 (not shown) that is configured to fix a print image printed onto the recording medium 120.

A print bar 102 can comprise one or more print heads 103 that, if applicable, are arranged in a plurality of rows side-by-side in order to print the dots of different columns 31, 32 of a print image onto the recording medium 120. In the example depicted in FIG. 1*a*, a print bar 102 comprises five print heads 103, wherein each print head 103 prints the dots of a group of columns 31, 32 of a print image onto the recording medium 120.

In the embodiment illustrated in FIG. 1*a*, each print head 103 of the print group 140 comprises a plurality of nozzles 21, 22, wherein each nozzle 21, 22 is configured to fire or eject ink droplets onto the recording medium 120. For example, a print head 103 of the print group 140 can comprise multiple thousands of effectively utilized nozzles 21, 22 that are arranged along a plurality of rows transverse to the transport direction 1 of the recording medium 120. Dots of a line of a print image can be printed onto the recording medium 120 transverse to the transport direction 1, i.e. along the width of the recording medium 120, by means of the nozzles 21, 22 of a print head 103 of the print group 140.

The printing device 100 also comprises a control unit 101, for example an activation hardware and/or a controller, that is configured to drive actuators of the individual nozzles 21, 22 of the individual print heads 103 of the print group 140 in order to apply the print image onto the recording medium 120 depending on print data.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For the purposes of this discussion, the terms "controller", "control unit", or "control device" shall be understood to be circuit(s) or processor(s), or a combination thereof, including memory storing instructions. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor.

The print group 140 of the printing device 100 thus comprises at least one print bar 102 having K nozzles 21, 22 that can be driven with a defined line timing in order to print a line (transverse to the transport direction 1 of the recording medium 120) with K pixels or K columns 31, 32 of a print image onto the recording medium 120 (with K>1000). In the depicted example, the nozzles 21, 22 are installed so as to be immobile or fixed in the printing device 100, and the recording medium 120 is directed past the stationary nozzles 21, 22 with a defined transport velocity.

Furthermore, the printing device 100 comprises a sensor unit 150 that is configured to acquire sensor data, in particular image data, with regard to a print image printed onto the recording medium 120. For this purpose, the sensor unit 150 can be arranged after (relative to the transport direction 1) the one or more print bars 102. The sensor unit 150 can, for example, comprise an image camera or line camera.

The print quality of a print image printed by the printing device 100 can be negatively affected. For example, a printed print image may exhibit a visible streaking in the transport direction 1. Such a streaking can be caused by a different inking of individual nozzles 21, 22, by isolated nozzle failures, and/or by a transverse offset of the ink ejection of a nozzle 21, 22.

Figure 1B:
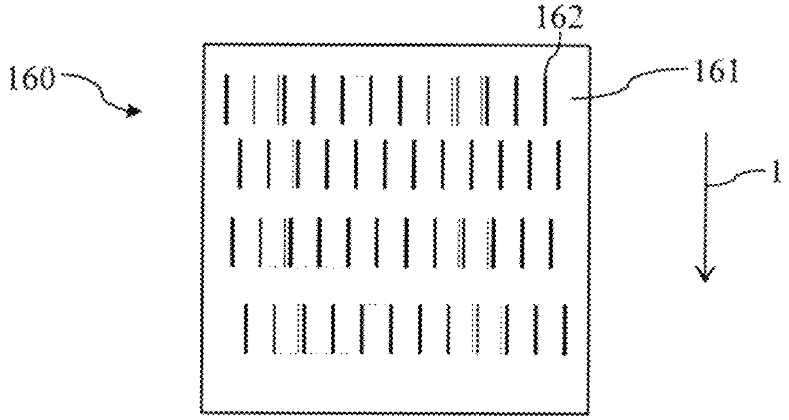
FIG. 1*b* an example of a test print image.

To detect a print image degradation, and/or to determine the cause of a degradation, a test print image 160 can be printed onto a recording medium 120 as is depicted by way of example in FIG. 1*b*. For example, the test print image 160 can be designed such that only subsets of the nozzles 21, 22 of the printing device 100 are driven section by section in order to enable a reliable detection of an impaired nozzle 21, 22. The test print image 160 depicted in FIG. 1*b* comprises a plurality of successive groups 161 of lines 162, wherein the individual lines 162 have respectively been printed by a single nozzle 21, 22. The lines 162 of a defined group 161 exhibit a defined spacing transverse to the transport direction 1, which enables the individual lines 162 and the corresponding nozzles 21, 22 to be reliably differentiated from one another. The lines 162 in the different groups 161 are printed by different nozzles 21, 22. This takes place in particular such that each nozzle 21, 22 of the printing device 100 generates precisely one line 162 of the test print image 160.

The printing of test print images 160 leads to an increased material consumption of ink and recording medium 120. The material consumption can be reduced by reducing the areal extent of the test print images 160, which may, however, negatively affect the quality of the detection and/or the quality of the identification of impaired nozzles 21, 22. In the present disclosure, a compact test print image or test pattern is described that enables a reliable detection and/or identification of impaired nozzles 21, 22.

Figure 2:
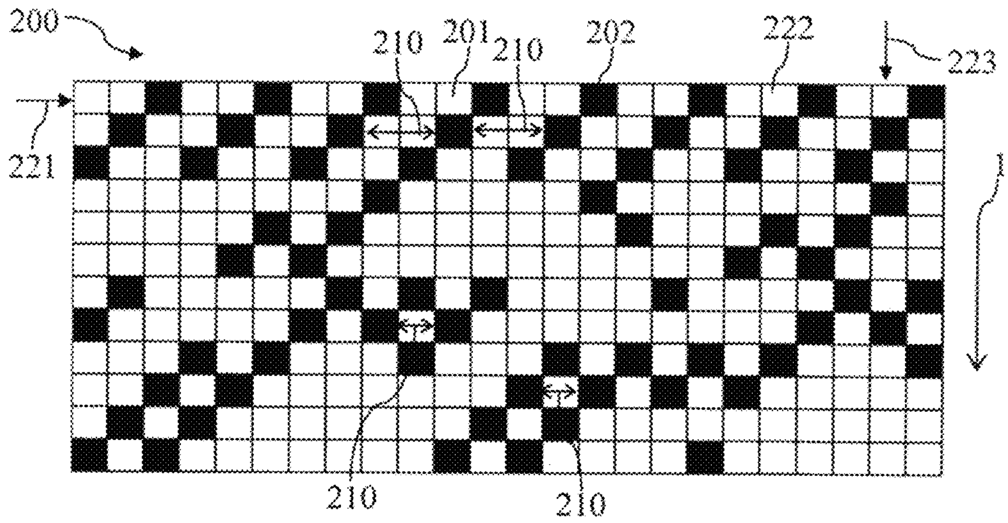
FIG. 2 an example of a compact test pattern.

In particular, a test pattern is described that, on the one hand, is optimally compact and thus as a test image takes up optimally little space on the recording medium 120, and nevertheless enables the results of one or more incorrectly operating nozzles 21, 22 to be unambiguously associated with the one or more responsible incorrectly operating nozzles 21, 22. FIG. 2 shows an example of a test pattern 200.

Within the individual lines 221, the test pattern 200 has a respective plurality of matrix points 222 for the corresponding plurality of nozzles 21, 22 of a print head 103 or of a print bar 102 of the printing device 100. In other words, precisely one matrix point 222 can be respectively provided for every single nozzle 21, 22 in every single row 221. The matrix points 222 for a defined nozzle 21, 22 are respectively arranged in a column 31, 32, 223 of the test pattern 200.

The test pattern 200 can thus correspond to a raster or a matrix with N×M matrix points 222, with M columns 223 and N rows 221. The individual matrix points 222 can respectively indicate whether at least one dot is printed or not by the respective nozzle 21, 22 in the respective row 221. A matrix dot 222 can thus be a printed matrix point, which is shown in black in FIG. 2, or a non-printed matrix point, which is shown in white in FIG. 2.

The test pattern 200 preferably exhibits one or more pattern properties. The test pattern 200 can comprise a pattern property with regard to a required minimum distance between printed matrix points 222 within the individual rows 221 of the test pattern 200. The minimum distance between two printed matrix points can, for example, be at least one column 223 or more. The minimum distance between two printed matrix points in a row 221 is preferably at least four columns. For example, the test pattern 200 can exhibit the pattern property that at least one non-printed matrix point 222, or at least two non-printed matrix points 222, is/are always arranged between two printed matrix points 222 of the individual rows 221 of the test pattern 200. By requiring a minimum spacing between printed matrix points 22 within the individual rows 221 of the test pattern 200, it can be achieved that the individual columns 223 of the test pattern 200, and thus the individual nozzles 21, 22 of the print head 103 or of the print bar 102, can be differentiated from one another at any time because the ink of adjacent printed matrix points 22 within a row 221 does not flow together, or these points do not optically merge or can still be differentiated by the scanner due to the imaging properties of said scanner.

Further pattern properties can relate to the frequency and/or the number of printed matrix points 222 in the different columns 223 of the test pattern 200. All columns 223 of the test pattern 200 preferably have the same number of printed matrix points 222. A uniform detection quality can thus be effected in the detection of impairments for all nozzles 21, 22 of the print bar 102 or of the print head 103.

The test pattern 200 can have a spatial encoding that enables a lateral offset of the test pattern 200 transverse to the transport direction 1 due to the optical properties of the scanner, media deformation, and other interfering influences to be detected and compensated for. In particular, an unambiguous association of a nonfunctioning nozzle 21, 22 within the total width of the pattern 200 can be ensured via the spatial encoding. For example, the spatial encoding can be achieved in that all columns 223 of the test pattern 200 differ from one another. In other words, the different columns 223 of the test pattern 200 can respectively have different sequences of printed and non-printed matrix points 222.

A maximum possible lateral offset V can be taken into account in the design of the test pattern 200. In particular, it can be taken into account that the test pattern 200 can be offset by at most ±V columns 223, for example with V between 5 and 20, due to measuring errors of the sensor unit 150 and/or due to impairments of the nozzles 21, 22. The test pattern 200 can then have a spatial encoding that is limited to detecting and compensating for a lateral offset of up to ±V columns 223. This can be achieved via a test pattern 200 that has at least 2*V columns 223 in a unique order. By reducing the number of different columns 223 of the test pattern 200, the required number of rows 221 of the test pattern 200 can also be reduced. In particular, 2*V columns 223 with different sequences of printed and non-printed matrix dots 222 can already by defined by using $\log_2$ (2*V) rows 221. The test pattern 200 can thus have a number N—possibly precisely one number N—of rows 221, wherein N corresponds to the nearest higher natural number greater than $\log_2$ (2*V). The test pattern can have a maximum line count of N≤2*V columns 223 in a unique order. The test pattern would then be very compact.

Figure 3:
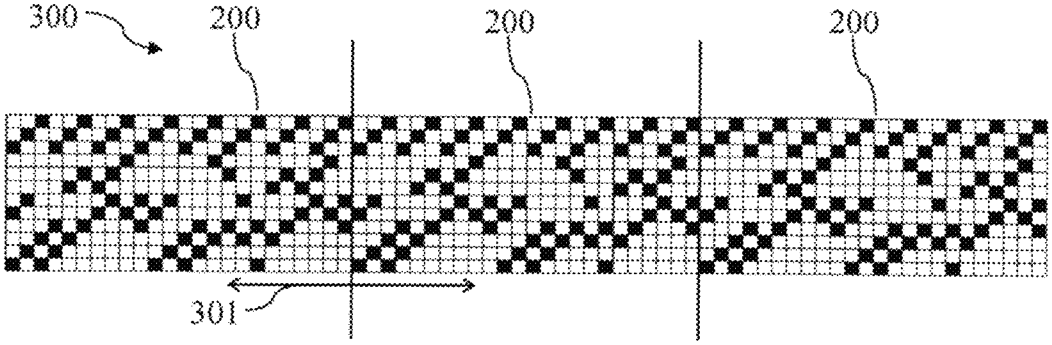
FIG. 3 a test pattern composed of a plurality of basic test patterns.

Such a test pattern 200 can be used as a basic test pattern that can be repeatedly strung together, transverse to the transport direction 1, in order to provide the complete test pattern 300 for the print head 103 or for the print bar 102, as is depicted by way of example in FIG. 3. The complete test pattern 300 enables a maximum possible lateral offset 301 of +V columns 223 to be detected and/or to be compensated for. The complete test pattern 300 can correspond to a stringing together of M (possibly identical) basic test patterns 200.

The basic test pattern 200 is preferably constructed such that one or more of the pattern properties described in this disclosure are also valid for the complete test pattern 300 with the stringing along of two or more basic test patterns 200. This preferably applies in particular for the pattern property with regard to the minimum spacing between printed raster cells 222 of the individual rows 221. The basic test pattern 200 can thus be designed so that it can be continued periodically, at least along the row direction.

In conjunction with the spatial encoding, the test pattern 200 can be continued periodically. The test pattern 200 typically does not need to enable a unique association across the entire plurality of the nozzles 21, 22 of a print head 103, because a rough orientation across the location of the imaged region already exists using an image of the sensor unit 150. The functionality of the spatial encoding thus typically needs only to cover the fine range. The functionality of the spatial encoding typically only needs to take place over a range that corresponds to the imprecision of the rough orientation using the association over the imaged region. If an association of the location of a nozzle 21, 22 with an imaged region is possible only with a precision of, for example, V=10 modular print image widths, the location must be uniquely associated only within a region of 2*V=20 modular print image widths 222. Following this region, the test pattern 200 can repeat periodically, for example as depicted in FIG. 3. As a result of this, the test pattern 200 has a reduced width, i.e. a reduced number of columns 223, and a reduced height, i.e. a reduced number of rows 221, so that an especially compact test pattern 200 can be provided.

The test pattern 200, 300 can be designed such that the test pattern 200, 300 has only precisely one printed matrix point for each nozzle 21, 22, i.e. in each column 223. An especially compact test pattern 200, 300 can thus be provided. However, it is typically advantageous that the test pattern 200, 300 has a certain redundancy of printed matrix points for the individual nozzles 21, 22 as a further pattern property, in order to be able to detect nozzles 21, 22 that sporadically print unreliably and/or do not print cleanly. Therefore, it can be advantageous that the test pattern 200, 300 respectively has a plurality of printed matrix points in the individual columns 223.

A further example of a pattern property is that the test pattern 200, 300 has no printed matrix dots that are directly adjacent to one another in a diagonal direction, meaning that they are arranged both in directly adjacent columns 223 and in directly successive rows 221. The detection quality for the detection of an impaired nozzle 21, 22 can thus be further increased.

The test pattern 200, 300 can be determined using a calculation model that is designed to generate, for example using a trial and error approach, a test pattern 200, 300 that satisfies one or more, in particular all, of the pattern properties described in this disclosure.

FIG. 2 shows an example of a test pattern 200 that is suitable for performing a certain detection of incorrectly operating nozzles 21, 22. The nozzle arrangement 102, 103 is arranged orthogonal to the printing direction 1. The columns 223 in the test pattern 200, 300 thus correspond to the individual nozzles 21, 22 of the nozzle arrangement 102, 103, in particular of the print head 103 or of the print bar 102. An example of a column 201 of the test pattern 200 from FIG. 2 indicates that the corresponding nozzle 21, 22 is activated three times within the test pattern 200, namely in the rows 2, 8, and 12. Each activation can be a single dot, or also a series of Q dots in chronological succession. Any arbitrary activation in any other column 202, 223 of the test pattern 200 is implemented with the same frequency within the test pattern 200 from FIG. 2.

For all columns 201, 202, 223 of the test pattern 200, it also applies that, for each dot 222, a dot 222 is never activated directly next to it to the left or right, because this would otherwise be placed too close and therefore would merge into one unit, which would hinder the evaluation. The same condition also applies if the basic test pattern 200 is repeated periodically to the left or right in order to form a complete test pattern 300, as is depicted by way of example in FIG. 3.

The test pattern 200 has a defined number of rows 220, so that each column 201, 202, 223 can be represented unambiguously in order to satisfy the spatial encoding, and/or in order to satisfy one or more further pattern properties.

One of the possible malfunctions of a nozzle 21, 22 is the ejection of ink droplets in an incorrect direction, which leads to an offset—in particular to a transverse offset—that leads to dots or pixels being applied onto the recording medium 120, and therefore to print image errors such as streaking and/or color errors.

The test pattern 200, and the detection based thereupon of an impaired nozzle 21, 22 with an incorrect orientation of the ink ejection, can make use of the fact that the incorrectly placed dots have the property that said incorrectly placed dots merge with one or more dots of adjacent other nozzles 21, 22 on the recording medium 120, and/or that the incorrectly placed dots are merged with the one or more dots of adjacent other nozzles 21, 22 due to the optical properties of the sampling of the print image by the sensor unit 150.

The test pattern 200 can be designed such that a printed matrix point in a defined column 201, 202 and in a defined row 221 has within the same row 221 one or more adjacent, printed matrix dots (in one or more adjacent columns 223) at a defined spacing 210. The printed matrix point in the defined column 201, 202 and in the defined row 221 preferably has, on both sides, a respective adjacent printed matrix point within the same row 221, wherein the adjacent printed matrix points respectively have a defined spacing 210 with respect to the printed matrix point, for example of one, two, or three columns 223. One or more non-printed matrix points are arranged between the printed matrix point and a directly adjacent printed matrix point within the same row 221.

The printed matrix point in the second row 221 and in the column 201 of the test pattern 200 from FIG. 2 has on both sides, i.e. to the right and left, a respective directly adjacent printed matrix point within the second row 221. The spacing 210 corresponds respectively to two columns 223 in which a respective non-printed matrix point is arranged.

The test pattern 200 can be designed such that the aforementioned conditions are satisfied for all columns 223 of the test pattern 200.

The test pattern 200 can thus be designed such that there are simultaneously activated neighboring nozzles 21, 22 for each nozzle 21, 22, in the same number and with a uniform spacing 210. In particular, for each nozzle 21, 22 there can be equally many simultaneously activated neighboring nozzles that are located at a spacing 210, or possibly at a plurality of different spacings 210, relative to one another. For example, within the test pattern 200 there can be a respective neighboring nozzle 21, 22, at a distance of two nozzle modules to the left and right, that are activated simultaneously. In addition, simultaneously activated neighboring nozzles can exist that are situated at different spacings 210, for example at a spacing of three nozzle modules. In that this mapping rule is enforced for all nozzles in the design of the test pattern 200, it can be ensured that all nozzles 21, 22 are equally affected by the phenomenon of dots merging with one another given incorrect placements. A detection of incorrect placements can thus be enabled with a uniform sensitivity.

Figure 4:
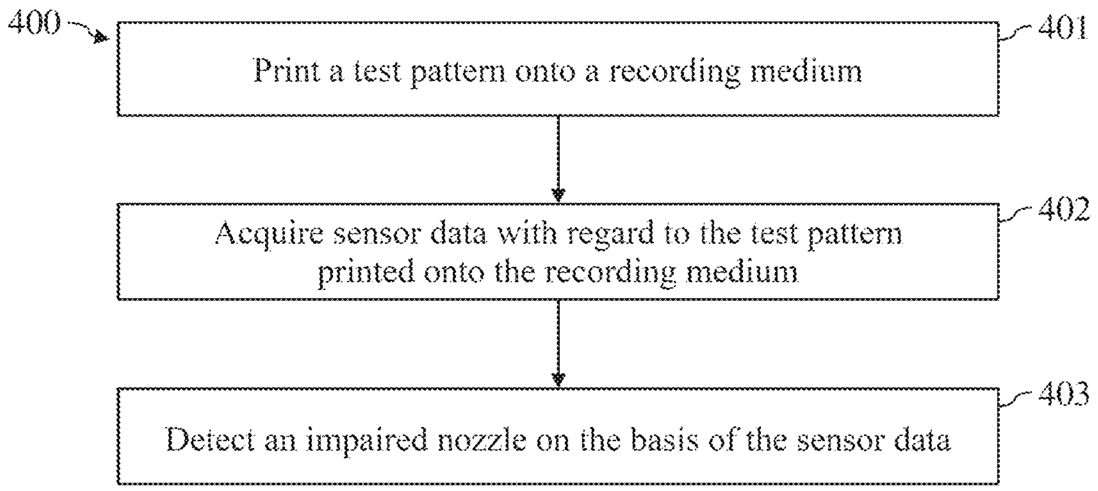
FIG. 4 a workflow diagram of an example of a method for detecting an impaired nozzle of a print head.

FIG. 4 shows a workflow diagram of an example of a (possibly computer-implemented) method 400 for detecting an impaired nozzle 21, 22 of a (typically stationary) print head 103 of an inkjet printing device 100. The print head 103 comprises K nozzles 21, 22 with K>10, typically K>100 or K>500 or K>1000, that are designed to print corresponding K dots in corresponding K columns 31, 32 of a line of a print image onto a recording medium 120. The method 400 can be executed by a control unit 101 of the printing device 100.

The method 400 comprises effecting 401 that a test pattern 200, 300 that is designed as described in this disclosure is printed by at least one print head 103 onto a recording medium 120. The test pattern 200, 300 corresponds to a printed test print image on the recording medium 120.

It can be effected that the test pattern 200, 300 is respectively additionally printed onto the recording medium 120 for each page of an effective print image that is to be printed. An impaired nozzle 21, 22 can thus be detected particularly quickly.

The method 400 also comprises the acquisition 402 of sensor data with regard to the test pattern 200, 300 printed onto the recording medium 120, i.e. with regard to the test print image. The sensor data can be acquired with a sensor unit 150 of the printing device 100, for example with a camera or with a line scanner.

Furthermore, the method 400 comprises the detecting 403 of at least one impaired nozzle 21, 22 of the print head 103 on the basis of the sensor data. The impaired nozzle 21, 22 can be efficiently and reliably detected using a neural network trained in advance.

The neural network can be designed to acquire the sensor data with regard to the test pattern 200, 300 as input data on an input side. Furthermore, for the purpose of comparison with the sensor data, the neural network can be designed to acquire the test pattern at a different input than input data on an input side. Furthermore, the neural network can be designed to specify, as output data at an output side, one or more nozzles 21, 22 that respectively exhibit an impairment with a defined probability. The test pattern 200, 300 described in this disclosure is particularly advantageously suitable for an evaluation using a neural network.

The neural network can have been trained in advance using training data, for example using a learning algorithm. The training data can comprise a plurality of data sets, for example 1000 or more, or 10000 or more data sets, wherein the individual data sets respectively comprise test input data and corresponding test output data for the neural network. The test input data can comprise test sensor data with regard to a printed test pattern 200, 300, i.e. with regard to a test print image that can likewise belong to the test input data, and the corresponding test output data can indicate the one or more nozzles 21, 22 that were impaired in the printing of the test pattern 200, 300 for which the test sensor data were acquired.

The neural network can be trained using the training data such that a defined error function that depends on the detection quality for the detection of impaired nozzles 21, 22 is reduced, in particular is minimized, for the training data. For this purpose, what is known as a back-propagation algorithm can be used that enables an adaptation of the parameters of the neural network to reduce the error function.

If applicable, an additional training and/or adaptation of the neural network can take place within the scope of the method 400. In particular, during the operation of the printing device 100, additional training data can be determined that can be used to further train the neural network.

Within the scope of the method 400, it can be effected that a master test pattern, i.e. a corresponding master print image, is printed by the print head onto the recording medium in addition to the test pattern 200, 300. The master test pattern, i.e. the corresponding master print image, can take up a print area on the recording medium that is larger than the test pattern 200, 300 by a factor of 2 or more, in particular by a factor of 4 or more. The master test pattern, i.e. the master print image, can correspond to, for example, the test print image 160 described in conjunction with FIG. 1*b*. The master test pattern can be designed such that said master test pattern enables the detection of one or more impaired nozzles 21, 22 with a detection probability that is higher than the detection probability given the use of the test pattern 200, 300. It can likewise be used to generate training data for the method 400 in order to initially train the network, or to expand the training for designated conditions such as previously unused substrates or inks.

The method 400 can comprise the detection 402 of master sensor data with regard to the master test pattern printed onto the recording medium 120, i.e. with regard to the master print image. The master sensor data can be acquired with the sensor unit 105 of the printing device 100.

The method 400 can also comprise the determination of training data for training the neural network on the basis of the master sensor data. The master sensor data can be used to detect one or more impaired nozzles 21, 22 with a relatively high detection probability. These one or more nozzles 21. 22 can be used as test output data for the neural network. With regard to the test pattern 200, 300, the corresponding sensor data can also be used as test input data for the neural network. These test input data and test output data can be used as a data set to further train the neural network using a training algorithm.

A repeated training of the neural network can thus be effected during the operation of the printing device 100. For this purpose, a respective master test pattern can be printed with a defined repetition rate, for example every 10 or more, or 50 or more, or 100 or more pages of usable print images, and be used to train the neural network. The quality of the detection of impaired nozzles 21, 22 on the basis of the test pattern 200, 300 described in this disclosure can thus be further increased.

Not yet mentioned is the method of purposefully not activating nozzles in the printing of the test pattern 200, 300, and of thereby simulating nozzle failures. A large set of training material can be obtained in this way. One A3 page per color is sufficient for a complete training. However, the data obtained with the pattern 160 also contain sideshooters (laterally offset dots) that cannot be purposefully caused. The user is thereby always reliant on the small number of sideshooters that occur randomly with low frequency.

In this disclosure, a compact test pattern 200, 300 is thus described for the detection of an impaired nozzle 21, 22 of a (possibly stationary) print head 103 of an inkjet printing device 100. The print head 103 comprises K nozzles 21, 22, for example with K>10, that are designed to print corresponding K dots in corresponding K columns 31, 32 of a line of a print image onto a recording medium 120. The print head 103 typically comprises K>100, or K>500, or K>1000 nozzles 21, 22. A one-to-one relation can exist between the nozzles 21, 22 and the columns 31, 32.

The test pattern 200, 300 comprises a matrix with matrix points 222, wherein the matrix of matrix points 222 has, in particular has precisely, a number M of columns 223 for a subset of or all corresponding K nozzles 21, 22 and, in particular precisely, a number N of rows 221, with N>1. The individual matrix points 222 of the matrix of matrix points 222 can respectively correspond to Q dots in Q successive lines of a print image, with Q≥1, in particular Q≥2 or Q≥10; Q=3 is preferable. In other words, a matrix point 222 of the test pattern 200, 300 can, if applicable, correspond to a plurality of dots in successive lines of the test print image printed onto the recording medium 120. A matrix point 222 of the test pattern 200, 300 can thus correspond to a line 162 with respectively Q dots of the corresponding test print image.

The individual matrix points 222 can thus, if applicable, correspond respectively to precisely one dot, in order to provide an optimally compact test pattern 200, 300 or test print image. On the other hand, the detection probability for the detection of impaired nozzles 21, 22 can typically be increased by using Q>1.

In each of the K columns 223, the test pattern 200, 300 can respectively have a sequence of N matrix points 222, of which one or more are printed matrix points and one or more are non-printed matrix points. A printed matrix point is depicted as a black and/or filled square in FIGS. 2 and 3. A non-printed matrix point is depicted as a white and/or non-filled square in FIGS. 2 and 3.

A printed matrix point in a defined column 223 and in a defined row 221 respectively indicates that the nozzle 21, 22 corresponding to the defined column 223 prints at least or precisely one dot in the printing of the defined row 221 of the test pattern 200, 300. In particular, the printed matrix point can indicate that Q dots are printed onto the recording medium 120 in Q lines of the test print image corresponding to the test pattern 200, 300, wherein Q lines of the test print image correspond to precisely one row 221 of the test pattern 200, 300.

A non-printed matrix point in the defined column 223 and in the defined row 221 respectively indicates that the nozzle 21, 22 corresponding to the defined column 223 prints no dot upon printing of the defined row 221 of the test pattern 200, 300. The non-printed matrix point can in particular indicate that dots are printed onto the recording medium 120 in none of the Q lines of the test print image corresponding to the test pattern 200, 300.

In a preferred example, the test pattern 200, 300 is designed such that a uniform number of printed matrix points is respectively arranged in the individual columns 223 of the test pattern 200, 300. For example, the K sequences of, respectively, N matrix points 222 respectively have precisely R printed matrix points 222. R>1 is thereby typical, and/or R<N. R can possibly be between N/5 and N; R=N/4 is preferable. A uniform detection probability for all K nozzles 21, 22 of the print head 103 can be produced by using a uniform number of printed matrix points in the individual columns 223 of the test pattern 200, 300.

The test pattern 300 can have a number G of basic test patterns 200 that are arranged serially in the row direction that runs transverse to the transport direction or printing direction 1, with G>1, for example G=2, or G=3, or G≥4. The number G of basic test patterns 200 can respectively comprise a partial matrix with K/M columns 223 and N rows 221 of matrix points 222. The number G of basic test patterns 200 can also be identical. In one example, the complete test pattern 300 can thus be composed of G identically constructed basic test patterns 200 that are arranged side by side relative to the printing direction 1. A particularly compact test pattern 300 can thus be provided for a reliable detection of impaired nozzles 21, 22.

In the printing of the test print image corresponding to the test pattern 200, 300, and/or in the acquisition of the sensor data with regard to the test print image, a lateral offset 301 can occur transverse to the printing direction 1, due to which the detection quality for detecting an impaired nozzle 21, 22 is impaired. In particular, due to such a lateral offset 301 it can be effected that a corresponding lateral offset results at the nozzle 21, 22, which is detected as impaired.

The K sequences of N matrix points 222 in the corresponding K columns 223 can differ from one another such that a lateral offset 301 of up to +V columns 223 of the test pattern 200, 300 can be detected and compensated for, with $V \geq 1$, in particular $V \geq 2$ or $V \geq 5$ or $V \geq 10$. Via a different layout of the K sequences of N matrix points 222, it can thus be achieved that a lateral offset 301 of up to +V columns 223 can be detected and compensated for. The different sequences can thereby differ in how printed matrix points and non-printed matrix points are arranged within the respective column 223. A particularly high detection quality can be produced via the variation of the sequences of matrix points 222 in a compact manner.

A test pattern 200, 300 is thus described for detecting an impaired nozzle 21, 22 of an inkjet printing device 100 that includes a matrix with matrix points 222, wherein the columns 223 of the matrix differ from one another such that a lateral offset of up to +V columns 223 can be detected and compensated for due to the differently designed columns 223. An impaired nozzle 21, 22 can thus be particularly reliably and robustly detected.

As has already been presented further above, the test pattern 200, 300 can have M basic test patterns 200 that are arranged serially in the row direction. The sequences of N matrix points 222 can respectively differ from one another in the K/M columns 223 of the individual basic test patterns 200 such that a lateral offset 301 of up to +V columns 223 of the test pattern 200, 300 can be detected and compensated for. It can thereby be ensured that $K/M \geq 2^*V$. The detection of the lateral offset 301 can thus be respectively enabled by the individual basic test patterns 200 so that the detection quality can be further increased, and/or so that a particularly compact test pattern 300 can be provided.

The test pattern 200, 300 can have $N=2^*V$ or fewer rows 221. A particularly compact test pattern 200, 300 can thus be provided that furthermore enables the detection and compensation of a lateral offset 301 of up to ±V columns 223.

Alternatively or additionally, the test pattern 200, 300 can be designed such that the number and/or the frequency of printed matrix points 222 is different in different rows 221. A variation of the number and/or of the frequency of printed matrix points 222 can thus be produced in the different rows 221. The number and/or the frequency of printed matrix points 222 can in particular decrease, at least on average, either with rising or falling row index for the rows 221 of the test pattern 200, 300, i.e. within the respective column 223. Via the variation of the number and/or frequency of printed matrix points 222 in different rows 221 of the test pattern 200, 300, the detection quality of the detection of impaired nozzles 21, 22 can be further increased.

Alternatively or additionally, the test pattern 200, 300 can be designed such that a minimum number T of non-printed matrix points, for example with $T \geq 1$ or $T \geq 2$, is respectively arranged between two printed matrix points directly adjacent in the row direction in the individual rows 221 of the test pattern 200, 300. It can thus be effected that at least one non-printed matrix point is respectively arranged between two directly adjacent printed matrix points within the individual rows 221. By providing a spacing 210 between printed matrix points that corresponds to a defined minimum number T of non-printed matrix points, the detection quality of impaired nozzles 21, 22 can be further increased.

One possible impairment of a nozzle 21, 22 is that the ink ejected by the nozzle 21, 22 is ejected with a portion transverse to the printing direction 1, which leads to the dots printed by the impaired nozzle 21, 22 having a transverse offset transverse to the printing direction 1 within the test print image. The transverse offset can take place to the left side or the right side with respect to FIG. 2. A transverse offset to the left side can lead to

- the dots in a column 223 that are situated to the left of the column 201 of the impaired nozzle 21, 22 having an increased quantity of ink and/or an increased color intensity; and/or
- a column 223 that is situated to the right of the column 201 of the impaired nozzle 21, 22 having a reduced color intensity.

The same accordingly applies to a transverse offset to the right side.

The increased and/or reduced color intensity of the dots in the individual columns 223 can be used to detect an impaired nozzle 21, 22.

The test pattern 200, 300 can be designed such that at least one first printed matrix point is respectively arranged in the K columns 223, i.e. in particular in all columns 223, of the test pattern 200, 300, which at least one first printed matrix point has at least one directly adjacent first printed matrix point within the same row 221, which at least one directly adjacent first printed matrix point is spaced apart from the first printed matrix point by precisely a first number $L_1$ of columns 223, wherein $L_1 \geq 2$ or $L_1 \geq 3$, for example. In principle, $L_1 >= 1$ is also possible insofar as the points can be printed sufficiently small. Given a spacing of first printed matrix points by a number $L_1$ of columns 223, precisely $L_1 - 1$ non-printed matrix points can be arranged between the two directly adjacent first printed matrix points.

By providing a defined spacing between printed matrix points 222 of the test pattern 200, 300, changes in the color intensity of the dots of the corresponding test print image can be particularly reliably and robustly detected, whereby the detection quality of impaired nozzles 21, 22 is increased.

A test pattern 200, 300 for detecting an impaired nozzle 21, 22 of an inkjet printing device 100 is thus described that has a matrix with matrix points 222, wherein the printed matrix points 222 in the individual columns 223 respectively exhibit a defined spacing relative to one another in the row direction. An impaired nozzle 21, 22 with transverse offset can thus be particularly reliably and robustly detected.

The test pattern 200, 300 can be designed such that a respective first printed matrix point is arranged in $K - k_1$ columns 223 of the test pattern 200, 300, which first printed matrix point has on both sides a respective directly adjacent first printed matrix point within the same row 221, which directly adjacent first printed matrix point is spaced apart from the first printed matrix point by precisely the first number $L_1$ of columns 223. $k_1$ can thereby be dependent on the first number $L_1$ of columns 223. In particular, $k_1 = 2^*L_1$ can be true. The test pattern 200, 300 can thus exhibit a defined spacing of printed matrix points 222 on both sides, respectively. This can apply to all matrix points 222, apart from matrix points 222 that are arranged in one or more columns 223 at the border of the test pattern 200, 300.

Given an impaired nozzle 21, 22, the provision of a defined spacing of printed matrix points 222 on both sides, respectively, leads to an increase of the color intensity being produced on one side of the impaired nozzle 21, 22 due to the transverse offset, and to a corresponding reduction of the color intensity on the other side of the impaired nozzle 21, 22. This effect can be used to particularly reliably detect the impaired nozzle 21, 22.

The test pattern 200, 300 can be designed such that a respective second printed matrix point is respectively arranged in the K columns 223, i.e. in particular in all columns 223, of the test pattern 200, 300, which second printed matrix point has at least one directly adjacent second printed matrix point within the same row 221, which at least one directly adjacent second printed matrix point is spaced apart from the printed matrix point by precisely a second number L of columns 223, for example with L2≥2. The first number $L_1$ of columns 223 and the second number $L_2$ of columns 223 are thereby different.

The test pattern 200, 300 can preferably be designed such that a respective second printed matrix point is respectively arranged in $K-k_2$ columns 223, i.e. in particular in all columns (preferably on the outside, at the border) of the test pattern 200, 300, which second printed matrix point has a respective directly adjacent second printed matrix point on both sides within the same row 221, which directly adjacent second printed matrix point is spaced apart from the second printed matrix point by precisely the second number $L_2$ of columns 223. $k_2$ can thereby depend on the second number $L_2$ of columns 223; in particular, $k_2=2*L_2$. The test pattern can also be arranged at the border, because the pattern is constructed so that the construction rules are satisfied even in the boundary zones given its periodic continuation.

A plurality of different spacings of printed matrix points on at least one side or on both sides can thus be produced. The detection quality can be further increased by varying the defined spacings.

REFERENCE LIST

1 transport direction (of the recording medium)
21, 22 nozzle
31, 32 column (of the print image)
100 printing direction
101 control unit/control device
102 print bar
103 print head
120 recording medium
140 print group
150 sensor unit
160 test print image
161 group of lines
162 line
200 test pattern
201, 202 column
210 spacing
221 row
222 matrix point
223 column
300 test pattern
301 lateral offset
400 method for detecting an impaired nozzle
401-403 method steps

The invention claimed is:

1. A test pattern for detecting an impaired nozzle of a print head of an inkjet printing device, wherein the print head comprises K nozzles, with K>10, that are designed to print corresponding K dots in corresponding K columns of a line of a print image onto a recording medium, the test pattern comprising:

a matrix with matrix points, wherein the matrix of matrix points has K columns for the corresponding K nozzles and N rows, with N>1;

the test pattern has a respective sequence of N matrix points in each of the K columns, of which N matrix points one or more are printed matrix points and one or more are non-printed matrix points;

a printed matrix point in a defined column and in a defined row indicates that the nozzle corresponding to the defined column prints a dot upon printing the defined row of the test pattern;

a non-printed matrix point in the defined column and in the defined row indicates that the nozzle corresponding to the defined column does not print a dot upon printing the defined row of the test pattern;

the test pattern is designed such that a respective first printed matrix point is arranged in the K columns of the test pattern, which first printed matrix point has at least one directly adjacent first printed matrix point within the same row, which at least one directly adjacent first printed matrix point is spaced apart from the first printed matrix point by precisely the first number $L_1$ of columns, and $L_1 \geq 2$ or $L_1 \geq 3$;

the test pattern is designed such that a respective first printed matrix point is arranged in $K-k_1$ columns of the test pattern, which respective first printed matrix point has on both sides a respective directly adjacent first printed matrix point within the same row, which respective directly adjacent first printed matrix point is spaced apart from the first printed matrix point by precisely the first number $L_1$ of columns;

$k_1$ depends on the first number $L_1$ of columns; and $k_1=2*L_1$;

the test pattern is designed such that a respective second printed matrix point is arranged in the K columns of the test pattern, which respective second printed matrix point has at least one directly adjacent second printed matrix point within the same row, which directly adjacent second printed matrix point is spaced apart from the second printed matrix point by precisely a second number $L_2$ of columns;

$L_2 \geq 2$;

the first number $L_1$ of columns and the second number $L_2$ of columns are different;

the test pattern is designed such that the respective second printed matrix point is arranged in $K-k_2$ columns of the test pattern, which respective second printed matrix point has on both sides a respective directly adjacent second printed matrix point within the same row, which respective directly adjacent second printed matrix point is spaced apart from the second printed matrix point by precisely the second number $L_2$ of columns;

$k_2$ depends on the second number $L_2$ of columns; and $k_2=2*L_2$.

2. The test pattern according to claim 1, wherein individual matrix points of the matrix of matrix points correspond respectively to Q dots in Q successive lines of a print image, where Q>1.

3. The test pattern according to claim 1, further comprising a number G of basic test patterns that are arranged serially in a row direction, with G>1, wherein the basic test patterns respectively comprise a partial matrix with L columns and N rows of matrix points, wherein L is the number of columns of the test pattern.

4. The test pattern according to claim 1, wherein the sequences of N matrix points in the K columns differ from one another such that a lateral offset of up to ±V columns of the test pattern can be detected and compensated for, with V≥1.

5. A method for detecting an impaired nozzle of a print head of an inkjet printing device; wherein the print head comprises K nozzles, with K>10, that are designed to print corresponding K dots in corresponding K columns of a line of a print image onto a recording medium; wherein the method comprises printing a test pattern by the print head onto the recording medium, the test pattern comprising a matrix with matrix points, wherein the matrix of matrix points has K columns for the corresponding K nozzles and N rows, with N>1;

the test pattern has a respective sequence of N matrix points in each of the K columns, of which N matrix points one or more are printed matrix points and one or more are non-printed matrix points;

a printed matrix point in a defined column and in a defined row indicates that the nozzle corresponding to the defined column prints a dot upon printing the defined row of the test pattern;

a non-printed matrix point in the defined column and in the defined row indicates that the nozzle corresponding to the defined column does not print a dot upon printing the defined row of the test pattern;

the test pattern is designed such that a respective first printed matrix point is arranged in the K columns of the test pattern, which first printed matrix point has at least one directly adjacent first printed matrix point within the same row, which at least one directly adjacent first printed matrix point is spaced apart from the first printed matrix point by precisely the first number $L_1$ of columns, and $L_1 \geq 2$ or $L_1 \geq 3$;

the test pattern is designed such that a respective first printed matrix point is arranged in $K-k_1$ columns of the test pattern, which respective first printed matrix point has on both sides a respective directly adjacent first printed matrix point within the same row, which respective directly adjacent first printed matrix point is spaced apart from the first printed matrix point by precisely the first number $L_1$ of columns;

$k_1$ depends on the first number $L_1$ of columns; and $k_1=2*L_1$;

the test pattern is designed such that a respective second printed matrix point is arranged in the K columns of the test pattern, which respective second printed matrix point has at least one directly adjacent second printed matrix point within the same row, which directly adjacent second printed matrix point is spaced apart from the second printed matrix point by precisely a second number $L_2$ of columns;

$L_2 \geq 2$;

the first number $L_1$ of columns and the second number $L_2$ of columns are different;

the test pattern is designed such that the respective second printed matrix point is arranged in $K-k_2$ columns of the test pattern, which respective second printed matrix point has on both sides a respective directly adjacent second printed matrix point within the same row, which respective directly adjacent second printed matrix point is spaced apart from the second printed matrix point by precisely the second number $L_2$ of columns;

$k_2$ depends on the second number $L_2$ of columns; and $k_2=2*L_2$;

recording sensor data with regard to the test pattern printed onto the recording medium; and detecting an impaired nozzle of the print head based on the sensor data.

6. The method according to claim 5, further comprising additionally printing the test pattern onto the recording medium for every page to be printed of a usable print image.

7. The method according to claim 5, wherein the impaired nozzle of the print head is detected based on the sensor data using a neural network trained in advance.

8. The method according to claim 7, further comprising printing a master test pattern onto the recording medium by the print head;

acquiring master sensor data with regard to the master test pattern printed onto the recording medium; and determining training data for training the neural network based on the master sensor data.

9. An inkjet printing device, comprising:

a print head comprising K nozzles, with K>10, the K nozzles designed to print corresponding K dots in corresponding K columns of a line of a print image onto a recording medium;

a sensor unit configured to acquire sensor data with regard to a print image printed onto the recording medium; and a control unit comprising a processor configured to:

instruct the print head to print a test pattern onto the recording medium, the test pattern comprising a matrix with matrix points, wherein the matrix of matrix points has K columns for the corresponding K nozzles and N rows, with N>1;

the test pattern has a respective sequence of N matrix points in each of the K columns, of which N matrix points one or more are printed matrix points and one or more are non-printed matrix points;

a printed matrix point in a defined column and in a defined row indicates that the nozzle corresponding to the defined column prints a dot upon printing the defined row of the test pattern;

a non-printed matrix point in the defined column and in the defined row indicates that the nozzle corresponding to the defined column does not print a dot upon printing the defined row of the test pattern;

the test pattern is designed such that a respective first printed matrix point is arranged in the K columns of the test pattern, which first printed matrix point has at least one directly adjacent first printed matrix point within the same row, which at least one directly adjacent first printed matrix point is spaced apart from the first printed matrix point by precisely the first number $L_1$ of columns, and $L_1 \geq 2$ or $L_1 \geq 3$;

the test pattern is designed such that a respective first printed matrix point is arranged in $K-k_1$ columns of the test pattern, which respective first printed matrix point has on both sides a respective directly adjacent first printed matrix point within the same row, which respective directly adjacent first printed matrix point is spaced apart from the first printed matrix point by precisely the first number $L_1$ of columns;

$k_1$ depends on the first number $L_1$ of columns; and $k_1=2*L_1$;

the test pattern is designed such that a respective second printed matrix point is arranged in the K columns of the test pattern, which respective second printed matrix point has at least one directly adjacent second printed matrix point within the same row, which directly adjacent second printed matrix point is spaced apart from the second printed matrix point by precisely a second number $L_2$ of columns;

$L_2 \geq 2$;

the first number $L_1$ of columns and the second number $L_2$ of columns are different;

the test pattern is designed such that the respective second printed matrix point is arranged in $K-k_2$ columns of the test pattern, which respective second printed matrix point has on both sides a respective directly adjacent second printed matrix point within the same row, which respective directly adjacent second printed matrix point is spaced apart from the second printed matrix point by precisely the second number $L_2$ of columns;

$k_2$ depends on the second number $L_2$ of columns; and $k_2=2*L_2$;

record the sensor data with regard to the test pattern printed onto the recording medium from the sensor unit; and detect an impaired nozzle of the print head based on the sensor data.

10. The inkjet printing device according to claim 9, wherein the processor is further configured to: control the print head to additionally print the test pattern onto the recording medium for every page to be printed of a usable print image.

11. The inkjet printing device according to claim 9, wherein the impaired nozzle of the print head is detected based on the sensor data using a neural network trained in advance.

12. The inkjet printing device according to claim 11, wherein the processor is further configured to:

control the print head to print a master test pattern onto the recording medium;

acquire master sensor data with regard to the master test pattern printed onto the recording medium from the sensor unit; and determine training data for training the neural network based on the master sensor data.

13. The inkjet printing device according to claim 9, wherein the sensor unit is arranged after, relative to a transport direction of the recording medium, one or more print bars of the print head.

14. The inkjet printing device according to claim 9, wherein the sensor unit comprises at least one of an image camera or a line camera.

* * * * *